United States Patent
Helms et al.

(10) Patent No.: US 11,429,446 B2
(45) Date of Patent: Aug. 30, 2022

(54) DEVICE DATA COLLECTOR AGENT COMPONENT ON CLOUD COMPUTING NETWORK

(71) Applicant: HEWLETT-PACKARD DEVELOPMENT COMPANY, L.P., Spring, TX (US)

(72) Inventors: Janine Louise Helms, Boise, ID (US); Mark Fahrenkrug, Waukee, IA (US); Patrick O'Donnell, Bishop, CA (US); Matthew Tollestrup, San Diego, CA (US); Timothy Blair, Boise, ID (US); Shane Konsella, Boise, ID (US); Kevin Pearson, Moore, ID (US); Laurent Pizot, Vancouver, WA (US); Cooper Urie, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/604,174

(22) PCT Filed: Apr. 24, 2018

(86) PCT No.: PCT/US2018/029068
§ 371 (c)(1),
(2) Date: Oct. 10, 2019

(87) PCT Pub. No.: WO2019/209264
PCT Pub. Date: Oct. 31, 2019

(65) Prior Publication Data
US 2021/0326181 A1    Oct. 21, 2021

(51) Int. Cl.
*H04N 1/327*    (2006.01)
*G06F 9/50*    (2006.01)
(Continued)

(52) U.S. Cl.
CPC .......... *G06F 9/5022* (2013.01); *G06F 3/1203* (2013.01); *G06F 3/126* (2013.01);
(Continued)

(58) Field of Classification Search
CPC ...... G06F 3/1203; G06F 3/1259; G06F 3/126; G06F 3/1287; G06F 3/1288; H04L 67/141
(Continued)

(56) References Cited

U.S. PATENT DOCUMENTS 9,036,184 B2    5/2015   Liu
9,158,479 B2    10/2015  Motamed et al.
(Continued)

FOREIGN PATENT DOCUMENTS

WO    WO2011115987 A2    9/2011
WO    WO2013126570 A1    8/2013
WO    WO2015167108 A1    11/2015

*Primary Examiner* — Jamares Q Washington
(74) *Attorney, Agent, or Firm* — Michael A Dryja

(57) ABSTRACT

A data collector agent (DCA) connector component running on a cloud computing network signals to a device interfacing platform component that a work request is ready. The device interfacing platform component runs on the cloud computing network and interfaces a device located outside the cloud computing network to the cloud computing network. The work request is for the DCA connector component to perform in conjunction with the device. The DCA connector component establishes a communication session with the device via the device interfacing platform component as initiated by the device. The DCA connector component performs the work request in conjunction with the device by tunneling to the device through the established communication session.

15 Claims, 4 Drawing Sheets

(51) Int. Cl.
*G06F 3/12* (2006.01)
*H04L 67/141* (2022.01)
*H04L 67/10* (2022.01)

(52) U.S. Cl.
CPC .......... *G06F 3/1244* (2013.01); *G06F 3/1259* (2013.01); *G06F 3/1287* (2013.01); *H04L 67/141* (2013.01); *G06F 2209/508* (2013.01); *H04L 67/10* (2013.01)

(58) Field of Classification Search
USPC ............ 358/1.15, 426.16, 407; 709/202, 224
See application file for complete search history.

(56) References Cited

U.S. PATENT DOCUMENTS

| | | |
|---|---|---|
| 9,218,578 B2 | 12/2015 | Burke |
| 9,335,958 B2 | 5/2016 | Anno et al. |
| 9,436,414 B2 | 9/2016 | Kamath et al. |
| 9,712,511 B2 | 7/2017 | Loo |
| 2002/0107873 A1 | 8/2002 | Winkler et al. |
| 2003/0184782 A1* | 10/2003 | Perkins ................. G06F 3/1225 358/1.13 |
| 2011/0276986 A1* | 11/2011 | Kamath ................ G06F 21/608 358/1.15 |
| 2014/0082173 A1* | 3/2014 | Kaneko ................... H04L 41/24 709/223 |
| 2014/0368859 A1 | 12/2014 | Gutnik et al. |
| 2014/0368865 A1 | 12/2014 | Gutnik et al. |
| 2015/0074218 A1 | 3/2015 | Shih |
| 2015/0263886 A1* | 9/2015 | Wang ..................... H04L 41/28 370/254 |
| 2017/0341183 A1 | 11/2017 | Bulller et al. |

\* cited by examiner

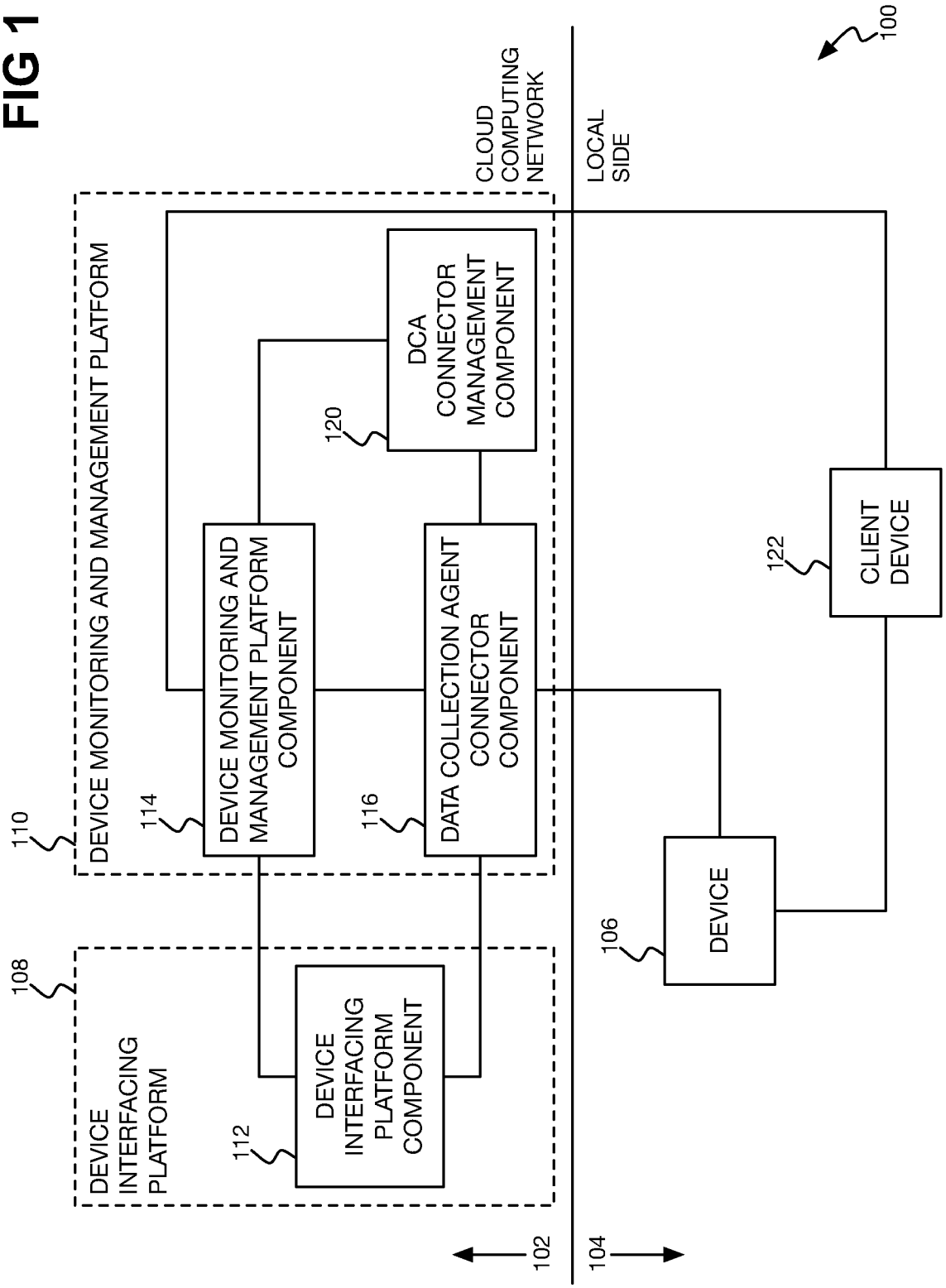

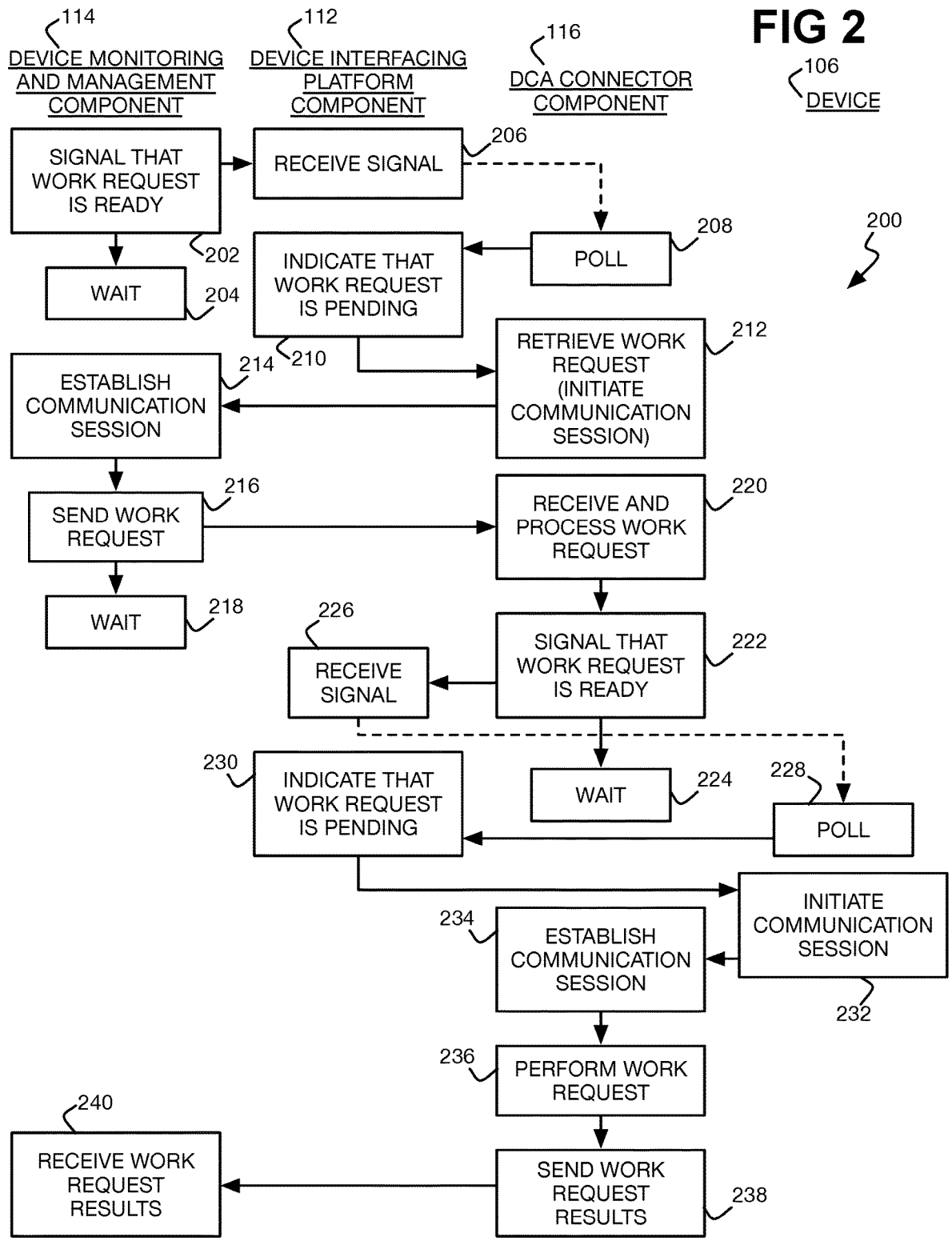

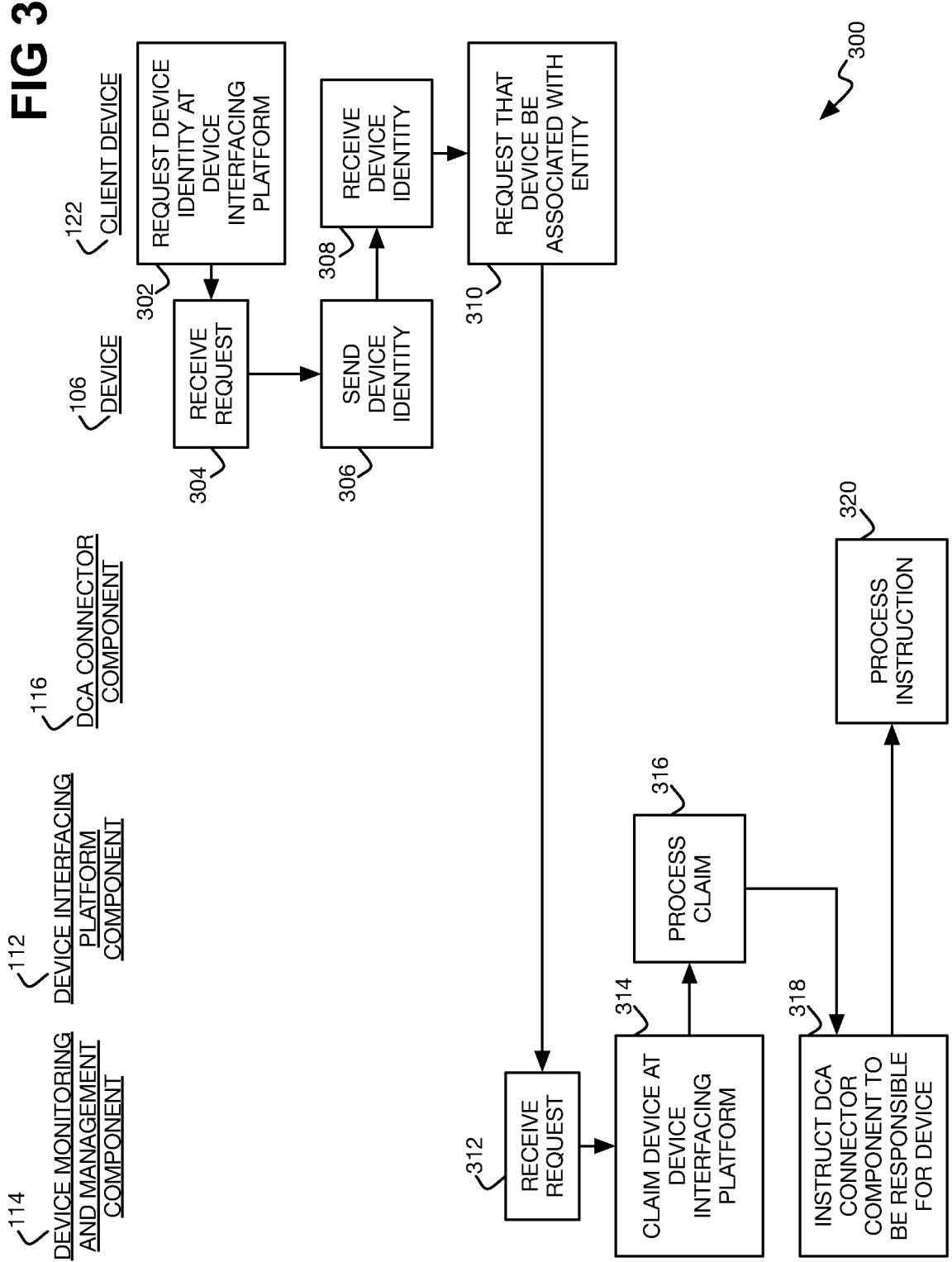

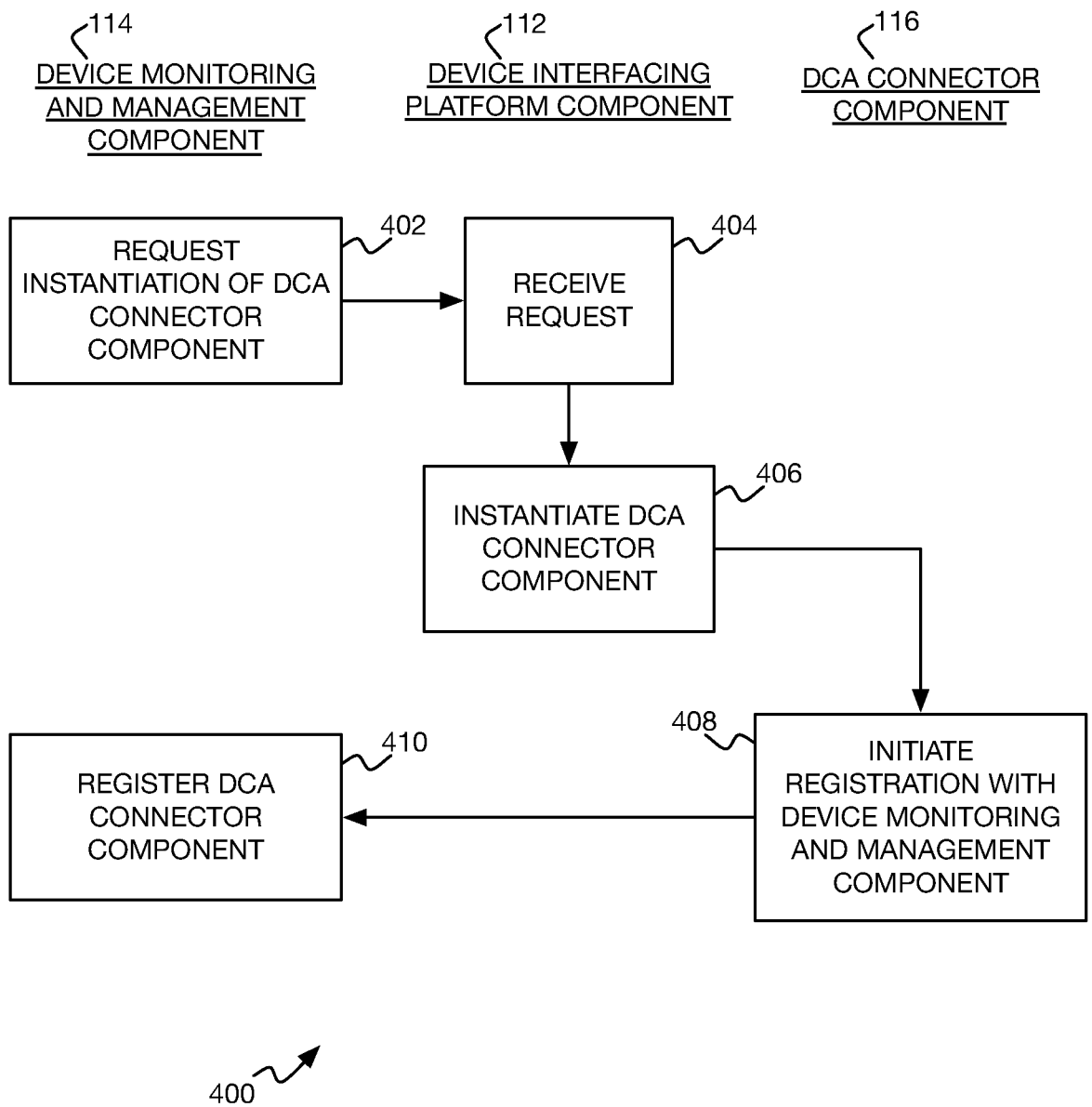

DEVICE DATA COLLECTOR AGENT COMPONENT ON CLOUD COMPUTING NETWORK

BACKGROUND

Organizations and entities like enterprises and governmental institutions, among other types of organizations and entities, can commonly have hundreds if not thousands or more printing devices for their employees to use in day-to-day activities. For example, an enterprise that has many locations across the globe may have tens, hundreds, or more such printing devices—or as few as one printing device—at each separate location. Printing devices can include stand-alone printers, as well as all-in-one (AIO) and multifunction printer (MFP) devices that include functionality like scanning, copying, and/or faxing functionality in addition to printing functionality.

BRIEF DESCRIPTION OF THE DRAWINGS

FIG. 1 is a diagram of an example system for monitoring and managing a device over a cloud computing network.

FIG. 2 is a flowchart of an example method for monitoring and managing a device over a cloud computing network.

FIG. 3 is a flowchart of an example method for registering a device so that the device can be monitored and managed over a cloud computing network.

FIG. 4 is a flowchart of an example method 400 for instantiating device collection agent (DCA) software on a cloud computing network so that a device can be monitored and managed over the cloud computing network.

DETAILED DESCRIPTION

As noted in the background section, an organization or entity may have a large number of printing devices dispersed over various geographically separate locations. A network administrator or other user may be responsible for managing printing devices at the same location as the user, as well as at other locations remote to the user. Management can include monitoring the supplies status of the printing devices, so that there is a sufficient amount of toner and other consumables on-hand at each location, as well as monitoring the usage of the printing devices, so that maintenance can be properly scheduled, so that the devices can be efficiently deployed, and so on.

A cloud computing network may be used to manage the printing devices at disparate locations. A cloud computing network can be considered as a network of remote server computing devices and other computing resources that may be hosted on the Internet, to store, manage, and process data, in lieu of local server computing devices and other computing resources. An organization or entity may use a third party cloud computing network, so that the organization or entity does not have to maintain such computing resource infrastructure, nor have to purchase the infrastructure upfront.

A software platform may thus be hosted on a cloud computing network for monitoring and managing fleets of printing devices. The printing devices themselves have usually resided within local networks that may be firewalled. An example of a hosted software platform for printing device monitoring and management is the JetAdvantage Management (JAM) platform, available from HP Inc. of Palo Alto, Calif.

Even though the monitoring and management software platform itself is hosted on a cloud computing network, additional software may still have to run within the network at each location at which printing devices reside that are to be monitored and managed. Such software can include data collection agent (DCA) connector software. Although originally DCA initially referred to just data collection, this terminology has as commonly understood within the industry grown to encompass more than data collection, albeit with no change in name.

The DCA connector software intermediates communication between the monitoring and management software platform hosted on the cloud computing network and each printing device at the same location at which the DCA connector software has been installed. Therefore, a network administrator does not need to expose the printing devices through the firewall. Furthermore, the monitoring and management software platform itself can use a common protocol to monitor and manage every printer, with the DCA software itself translating requests from the platform to a format understood by a particular kind or type of printing device.

However, locating the DCA connector software inside each network at which a printer to be managed and monitored resides means that there has to be computing resources—i.e., hardware—at each network on which to install the DCA connector software. At first such computing resources included server computing devices that the network administrator had to manage; more recently standalone network appliances that may need less maintenance have been used. The DCA connector software itself also has to be maintained and updated, placing further burdens on the network administrator.

Furthermore, some entities and organizations do not permit the installation new software, such as DCA connector software, or new hardware, such as appliances running the DCA connector software, without arduous review and approval by multiple users. This can ensure that the software and hardware will not deleteriously affect the existing information technology (IT) infrastructure or pose a security threat. Other entities and organizations have heightened security that may not even permit outside software or hardware to be installed within their networks.

Additionally, at very small locations, including single teleworker locations, the printing devices may not even be part of local networks per se. The printing devices may be wireless devices, for instance, which may be able to connect to the Internet, and that may communicate with a user's host computing device directly on an ad hoc point-to-point basis. Having to place DCA connector software within each location network at which a printing device to be managed resides so that each printing device can be managed by a cloud computing hosted software platform thus at best adds extra responsibilities to a network administrator, and at worst may not even be permitted.

Techniques described herein ameliorate these shortcomings. Specifically, the techniques described herein provide for the DCA connector software to be located on the cloud computing network, too, instead of having to have an instance of this software at each location at which a printing device to be managed and monitored resides. Constraints regarding prohibitions or safeguards against new software and hardware being installed on local networks are thus absolved. Locating the DCA connector software on the cloud decreases the amount of extra responsibilities added to a network administrator, and further one instance of the DCA connector software can intermediate communication between the monitoring and management software platform hosted on the cloud computing network and the printing devices at disparate locations.

FIG. 1 shows an example system 100. The system 100 is divided between a cloud computing network 102 and a local side 104. The cloud computing network 102 can include a network of remote server computing devices and other computing resources that may be hosted on the Internet, to store, manage, and process data, in lieu of local server computing devices and other computing resources at the local side 104. The cloud computing network 102 may be a cloud computing network hosted by a cloud computing network provider. Examples of such providers including Amazon Web Services (AWS), available from Amazon.com, Inc. of Seattle, Wash.; Microsoft Azure, available from Microsoft Corp., of Redmond, Wash.; and Google Cloud, available from Google LLC, of Mountain View, Calif.

A device 106 to be monitored and managed is located at the local side 104. The local side 104 may be a local network, for instance, of which the device 106 is a part, and that is connected to the cloud computing network 102 over the Internet or another type of network, such as an extranet. The device 106 may reside at the local side 104 outside the auspices of a local network, however, such as by being wirelessly or otherwise directly connected to the Internet so that the device 106 can communicate with the cloud computing network 102. The device 106 can be a printing device, such as a standalone printer, or an all-in-one (AIO) or multifunction printer (MFP) device that includes functionality like scanning, copying, and/or faxing functionality in addition to printing functionality.

A device interfacing platform 108 and a device monitoring and management platform 110, which are different and separate platforms, may be implemented on the cloud computing network 102. The device interfacing platform 108 provides for the interfacing of devices, like the device 106, to the cloud computing network 102 so that the devices are accessible over the cloud computing network 102. An example of the device interfacing platform 108 is the Web Print Platform (WPP), available from HP Inc.

Specifically, the device interfacing platform 108 includes a device interfacing platform component 112, which is software that runs on the hardware resources of the cloud computing network 102. The component 112 is the component of the platform 108 that interfaces devices located outside the cloud computing network 102, like the device 106, to the network 102. The device 106 may have built-in capability, for instance, that broadcasts its presence to the device interfacing platform component 112 when the device 106 is first turned on, and that provides for the protocols by which the component 112 communicates with the device 106.

The device monitoring and management platform 110 provides for the monitoring and management of devices, like the device 106. An example of the device monitoring and management platform 110 is the JAM platform, as noted above. The device monitoring and management platform 110 includes a device monitoring and management platform component 114, as well as a DCA connector component 116, and can also include a DCA connector management component 120. The device monitoring and management platform component 114 is the component of the platform 110 that monitors and manages devices, like the device 106, but does not directly communicate with such devices.

Rather, the DCA connector component 116 is the component of the device monitoring and management platform 110 that can directly communicate with the device 106 and other devices to be managed within the device monitoring and management platform 110. The device monitoring and management platform component 114 may issue commands that are not device-specific, and thus not directly understandable by a device. The DCA connector component 116 in turn translates such generic commands to formats directly understandable by devices, where the generic commands may be translated differently for different types of devices. The DCA connector component 116 can also translate device-specific responses received from the devices to a generic format before returning them to the device monitoring and management platform component 114. The DCA connector component 116 may be responsible for tens, hundreds, or more devices, like the device 106, of the different or same type or kind, and which may be located at the same or different physical locations.

In practice, when the device monitoring and management platform component 114 is to perform a monitoring or management operation in relation to the device 106, the component 114 can signal the device interfacing platform component 112 that the component 114 has a work request ready for the DCA connector component 116. The DCA connector component 116 may periodically poll the device interfacing platform component 112 to determine whether there are any such work requests pending for the component 116. At the next polling, the DCA component 116 learns that the device monitoring and management platform component 114 has a work request ready for the component 116, and directly establishes a communication session with the component 114 to retrieve the work request from the component 114.

The DCA component 116 may then translate the work request into a format understandable by the device 106. The DCA component 116 subsequently can signal the device interfacing platform component 112 that the component 116 has a work request ready for the device 106. Like the DCA connector component 116, the device 106 may periodically poll the device interfacing platform component 112 to determine whether there are any such work requests pending for the device 106. At the next polling, the device 106 learns that the DCA connector component 116 has a work request ready for the device 106, and in response directly establishes a communication session with the component 116. The DCA connector component 116 can then perform the work request in relation to the device 106 over this communication session.

The DCA connector management component 120 is responsible for initially instantiating the DCA connector component 116 responsive to instruction from the device monitoring and management platform component 114. The device monitoring and management platform component 114 instructs the DCA connector management component 120 in this respect to instantiate the first DCA connector component 116. Thereafter, the device monitoring and management platform component 114 can instruct the DCA connector management component 120 to instantiate additional such DCA connector components 116 when the number of additional devices 106 that have been added to the system 100 exceed the ability of the already existing component(s) 116 to effectively communicate with such devices 106 on behalf of the component 114.

In addition to the device 106, a client device 122 may be at least temporarily located at the local side 104. The client device 122 can be a desktop or laptop computer, for instance, a smartphone, a tablet computing device, or another type of computing device. The client device 122 can communicate with the device 106 because it is local to the device 106. As such, the client device 122 can register the device 106 to be monitored and managed with the device monitoring and management platform component 114, to permit such registration. Registration in this respect using the client device 122, as opposed to a user interacting directly with the device 106, permits a relatively large number of devices 106 to more easily be registered with the device monitoring and management platform component 114, so that the devices 106 can be managed via the device monitoring and management platform 110.

FIG. 2 shows an example method 200 for monitoring and managing the device 106 over the cloud computing network 102. The method 200 is divided into four columns. The device monitoring and management component 114 performs parts of the method 200 in the left-most column, and the device 106 performs parts of the method 200 in the right-most column. The device interfacing platform component 112 performs parts of the method 200 in the middle-left column, and the DCA connector component 116 performs parts of the method 200 in the middle-right column.

Each column of the method 200 can be implemented as instructions or program code stored on a non-transitory computer-readable data storage medium and executed by a processor of a computing device. For instance, the parts of the method 200 in the left-most column and the middle-right column can be implemented as instructions that respectively constitute the device monitoring and management component 114 and the DCA connector component 116 as different pieces of software, and which are performed by the hardware resources of the cloud computing network 102 that implement the device monitoring and management platform 110. The parts of the method 200 in the middle-left column can be implemented as instructions that constitute the device interfacing platform component 112 as software, and which are performed by the hardware resources of the cloud computing network 102 that implement the device interfacing platform 108. The parts of the method 200 in the right-most column can be implemented as instructions that hardware of the device 106 performs.

The method 200 concerns a work request initiated at the device monitoring and management component 114 pertaining to the device 106 for performance by the DCA connector 116 in conjunction with the device 106. The work request may be a monitoring request. For example, the component 114 may request that various characteristics of the device 106 be periodically (i.e., synchronously) reported, such as current operating temperature, consumables supply status, number of pages printed, and so on. The component 114 may request that an error or failure condition be immediately (i.e., asynchronously) reported, such as a printing engine failure, the depletion of consumables, the current operating temperature exceeding a maximum specified temperature, and so on. The work request may be a management request. For example, the component 114 may request that various parameters of the device 106 be set to specified settings, such as network settings, print settings, user permission settings, and so on.

When the device monitoring and management component 114 has a work request for the DCA connector component 116 to perform in relation to the device 106, the component 114 can signal to the device interfacing platform component 112 that the component 114 has a work request ready for the DCA connector component 116 (202). The device monitoring and management component 114 then waits for the DCA connector component 116 to retrieve the work request (204). The device interfacing platform component 112 receives the signal from the device monitoring and management component 114 (206).

The DCA connector component 116 periodically polls the device interfacing platform component 112 to learn whether there are any pending work requests for the component 116 to perform (208). The polling of part 208 is performed periodically, as opposed to responsive to the device interfacing platform component receiving the signal 206, which is why the arrowed line from part 206 to part 208 is dotted. Upon being polled, the device interfacing platform component 112 indicates to the DCA connector component 116 that the device monitoring and management component 114 has a work request pending for the component 116 (210). It is noted that the device interfacing platform component 112 does not itself have this work request, but rather just that there is a work request for the DCA connector 1106 pending at the device monitoring and management component 114.

Upon receiving indication that there is a work request pending at the device monitoring and management component 114, the DCA connector component 116 retrieves the work request from the component 114 (212). For example, the DCA connector component 116 may initiate a communication session with the device monitoring and management component 114 (212), which thus establishes a communication session with the component 116. Within this communication session, the device monitoring and management component 114 sends the previously signaled work request (216), and then can wait to receive results from performance of the work request (218).

The DCA connector component 116 thus receives and then processes the work request (220). The DCA connector component 116 can process the work request by converting translating the work request from a generic format as received by the device monitoring and management component 114 that is not particular to any specific type or kind of device, to a specific format understandable by the device 106 and particular to the type or kind of the device 106. The DCA connector component 116 then signals to the device interfacing platform component 112 that the (translated) work request is ready to be performed at, on, or to the device 106 (222), and waits for the device 106 to initiate a communication session with the component 116. The device interfacing platform component 112 receives the signal (226).

The device 106 periodically polls the device interfacing platform component 112 to learn whether there are any work requests pending that pertain to the device 106 (228). Similar to the polling of part 208, the polling of part 228 is performed periodically, and not directly responsive to the device interfacing platform component 112 receiving the signal in part 226, which is why the arrowed line between parts 226 and 228 is dotted. Upon being polled, the device interfacing platform component 112 indicates to the device 106 that there is a work request pending at the DCA connector component 116 that pertains to the device 106 (230).

The device 106 responsively initiates a communication session with the DCA connector component 116 (232), which thus establishes the communication session with the device 106. The DCA connector component 116 may establish a communication session with the device 106 via the WebSocket communication protocol. Such a communication session is considered as being established via the device interfacing platform component 112, since the component 112 is the mechanism by which the device 106 learns that it is to initiate the communication session with the DCA connector component 116. Protocols other than the WebSocket communication protocol may also be used, such as the SignalR protocol.

The DCA connector component 116 performs the work request in conjunction with the device 106 over the established communication session (236). For instance, the work request may be a Simple Network Management Protocol (SNMP) message that can be tunneled through the communication session, which may be a WebSocket communication session as noted above. The work request may include one or more web service requests, such as Hypertext Transport Protocol (HTTP) formatted requests. The requests may be stateless requests, such as Representational State Transfer (REST) requests. The requests may be formatted in accordance with an Extensible Markup Language (XML), Web Services Description Language, and/or JavaScript Object Notation (JSON) format.

Once the work request has been completed, the DCA connector component 116 can send the results of the work request back to the device monitoring and management component 114 (238), which receives the work request results. For a monitoring request, the work request results can be the values of the requested characteristics of the device 106 that the device 106 provided or that the DCA connector 116 retrieved from the device 106. For a management request, the work request results can be whether the configuration change specified in the request was successfully performed at the device 106 or not.

FIG. 3 shows an example method 300 for registering the device 106 with the device monitoring and management platform 110 so that the device monitoring and management platform component 114 can monitor and mange the device 106, such as in accordance with the method 200. The method 300 is divided into five columns. The device monitoring and management component 114 performs parts of the method 300 in the left-most column, and the device interfacing platform component 112 performs parts of the method 300 in the second column from the left. The DCA connector component 116 performs parts of the method 300 in the middle column. The device 106 performs parts of the method 300 in the second column from the right, and the client device 122 performs parts of the method 300 in the right-most column.

As in the method 200, each column of the method 300 can be implemented as instructions or program code stored on a non-transitory computer-readable data storage medium and executed by a processor of a computing device. For instance, the parts of the method 300 in the left-most column and the middle column can be implemented as instructions that respectively constitute the device monitoring and management component 114 and the DCA connector component 116 as different pieces of software, and which are performed by the hardware resources of the cloud computing network 102 that implement the device monitoring and management platform 110. The parts of the method 300 in the second column from the left can be implemented as instructions that constitute the device interfacing platform component 112 as software, and which are performed by the hardware resources of the cloud computing network 102 that implement the device interfacing platform 108. The parts of the method 300 in the second column from the right can be implemented as instructions that hardware of the device 106 performs, and the parts of the method 300 in the right-most column can be implemented as instructions that hardware of the client device 122 performs.

The method 300 is performed once the device 106 has registered itself with the device interfacing platform 108. The client device 122 requests the identity of the device 106 at the device interfacing platform 108 (302). This identity may be other than but similar to a network address like an Internet Protocol (IP) address, or a host name. The device 106 receives the request from the client device 122 (304), and sends its identity at the device interfacing platform 108 to the client device 122 (308), which receives the identity. The client device 122 may communicate with the device 106 over a local network to which both the devices 122 and 106 are connected, or in another manner. For example, the devices 122 and 106 may communicate via Bluetooth, near field communication (NFC), or via direct physical cable interconnection.

The client device 122 then requests that the device monitoring and management component 114 associate the device 106 with a particular entity (310). The entity may be the enterprise, organization, or other entity at which the device 106 is located. The entity may be a customer of the provider of the device monitoring and management platform 110, where this provider can itself be a customer of the provider of the client computing network 102. The client device 122 can include within this request the identity of the device 106 at the device interfacing platform 108, as well as other information concerning the device 106, such as serial number, and so on.

The device monitoring and management component 114 receives the request (312), and responsively claims the device 106 at the device interfacing platform 108 (314). The device interfacing platform component 112 processes this claim 316). For instance, the device interfacing platform component 112 associates the device 106, via its identity at the device interfacing platform 108 as provided by the device monitoring and management component 114, with the device monitoring and management platform 110. This association authorizes subsequent communication by the components of the device monitoring and management platform 110 and regarding the device 106 with the device interfacing platform component 112. As part of claiming the device 106, the device monitoring and management component 114 also associates the device 106 with the entity specified in the request received from the client device 122.

The device monitoring and management component 114 further instructs the DCA connector component 116 to be responsible for direct communication with the device (318). The DCA connector component 116 processes this instruction (320). As such, the DCA connector component 116 responsively polls the device interfacing platform component 112 periodically to determine whether the device monitoring and management platform component 114 has work requests for the component 116 to perform in relation to the device 106, as described above as to the method 200.

FIG. 4 shows an example method 400 for instantiating the DCA connector component 116. The first DCA connector component 116 is instantiated prior to any devices 106 being registered in accordance with the method 300. Thereafter, additional DCA connector components 116 may be instantiated as existing DCA connector components 116 are assigned the maximum number of devices 106 for which they can be responsible. As such, the method 400 is performed before the method 300 is performed for the first time, and before the method 200 is performed. The method 400 may subsequently be performed when a performance of the method 300 results in the need for additional DCA connector components 116.

The method 400 is divided into three columns. The device monitoring and management component 114 performs parts of the method 400 in the left column. The DCA connector management component 120 performs parts of the method 400 in the middle column. The DCA connector component 116 performs parts of the method 400 in the right column after the component 116 has been instantiated.

As in the methods 200 and 300, each column of the method 400 can be implemented as instructions or program code stored on a non-transitory computer-readable data storage medium and executed by a processor of a computing device. For instance, the parts of the method 400 in the left column can be implemented as instructions that constitute the device monitoring and management component 114 as software. The parts of the method 400 in the middle column can be implemented as instructions that constitute the DCA connector management component 120 as software. The parts of the method 400 in the right column can be implemented as instructions that constitute the DCA connector component 116 as software. These three pieces of software may be software from one another, and are performed by the hardware resources of the cloud computing network 102 that implement the device monitoring and management platform 110.

The device monitoring and management component 114 requests instantiation of the DCA connector component 116 (402). The DCA connector management component 120 receives this request, and responsively instantiates the DCA connector component 116 (406). For instance, the DCA connector management component 120 may instantiate an instance of a container for the software of the DCA connector component 116 to realize the DCA connector component 116 in this respect. The DCA connector management component 120 may instantiate this instance from a container repository. The container may be a Docker container, which is open-source container software developed by Docker, Inc., of San Francisco, Calif.

Once the DCA connector component 116 has been instantiated, the component 116 initiates registration of itself with the device monitoring and management component 114 (408). The device monitoring and management component 114 therefore responsively registers the DCA connector component 116 (410). Registration can ensure that the device monitoring and management component 114 receives confirmation that its request in part 402 has been satisfied. As part of the registration process, the DCA connector component 116 provides identifying information thereof to the device monitoring and management component 114, so that the component 114 can communicate with the component 116.

The techniques that have been described herein provide for locating DCA connector software on a cloud computing network, instead of local to the device to be monitored and managed. The techniques include how communication with the monitored and managed device occurs via the cloud DCA connector software. The techniques further include how the device is registered for monitoring and management, as well as how the cloud DCA connector software is instantiated.

We claim:

1. A non-transitory computer-readable data storage medium storing instructions executable by a processor that is to run a data collector agent (DCA) connector component on a cloud computing network to:
   signal that a work request is ready, to a device interfacing platform component that runs on the cloud computing network and that interfaces a device located outside the cloud computing network to the cloud computing network, the work request for the DCA connector component to perform in conjunction with the device;
   establish a communication session with the device via the device polling the device interfacing platform component and the device responsively initiating the communication session with the DCA connector component due to the device interface platform component indicating to the device that the work request is pending; and
   perform the work request in conjunction with the device by tunneling to the device through the established communication session.

2. The non-transitory computer-readable data storage medium of claim 1, wherein the instructions are executable by the processor that is to run the DCA connector component on the cloud computing network to further:
   poll the device interfacing platform component to determine whether a device monitoring and management platform component that runs on the cloud computing network has signaled any work requests to the device interfacing platform component for the DCA connector component; and
   responsive to receiving indication from the device interfacing platform component that the monitoring and management platform component has sent the work requests to the device interfacing platform component for the DCA connector component, retrieve the work request directly from the monitoring and management platform component,
   wherein the device interfacing component is part of a device interfacing platform implemented on the cloud computing network, the device monitoring and management platform component is part of a device monitoring and management platform implemented on the cloud computing network, and the device interfacing platform is different than the device monitoring and management platform.

3. The non-transitory computer-readable data storage medium of claim 2, wherein the instructions are executable by the processor that is to run the DCA connector component on the cloud computing network to further:
   before performing the work request in conjunction with the device, convert the work request to a format that is specific to and understandable by the device,
   wherein the work request as retrieved directly from the monitoring and management platform component is generic and unspecific to any particular device, including the device.

4. The non-transitory computer-readable data storage medium of claim 3, wherein the instructions are executable by the processor that is to run the DCA connector component on the cloud computing network to further:
   after the work request has been performed in conjunction with the device, directly send work request performance results back to the device monitoring and management platform component.

5. The non-transitory computer-readable data storage medium of claim 1, wherein the communication session comprises a Web Socket protocol communication session,
   and wherein the work request comprises one or more of a simple network management protocol (SNMP) request and a web service request.

6. A method comprising:
   signaling, by a device monitoring and management platform component running on a cloud computing network, to a device interfacing platform component running on the cloud computing network and separate from the device monitoring and management platform component that a work request is ready, the work request for a data collection agent (DCA) connector component running on the cloud computing network to perform in conjunction with a device located outside the cloud computing network and that the device interfacing platform component interfaces to the cloud computing network; and responsive to the device monitoring and management component receiving a request from the DCA connector component for the work request as a result of the device interfacing platform component indicating to the DCA connector component that the work request is pending in response to the DCA connector component polling the device interfacing platform component, directly sending, by the device monitoring and management platform component, the work request to the DCA connector component.

7. The method of claim 6, wherein the device interfacing component is part of a device interfacing platform implemented on the cloud computing network, the device monitoring and management platform component is part of a device monitoring and management platform implemented on the cloud computing network, and the device interfacing platform is different than the device monitoring and management platform.

8. The method of claim 6, further comprising:
after signaling that the work request is ready, waiting, by the device monitoring and management platform component, for the DCA connector component to retrieve the work request.

9. The method of claim 6, further comprising:
responsive to receiving a request from the DCA connector component for the work request, establishing, by the device monitoring and management platform, establishing a communication session with the DCA connector component via the device interfacing platform component as initiated by the DCA connector component,
wherein the work request is directly sent to the DCA connector component by tunneling to the DCA connector component through the established communication session.

10. The method of claim 6, further comprising:
after sending the work request to the DCA connector component, directly receiving, by the device monitoring and management platform component, work request performance results from the DCA connector component.

11. The method of claim 6, further comprising:
receiving, by the device monitoring and management platform component and from a client device located outside the cloud computing network, a request to associate the device with an entity that the device monitoring and management platform services;
claiming, by the device monitoring and management platform component, the device within the device interfacing platform; and
instructing, by the device monitoring and management platform component, the DCA connector component to be responsible for direct communication with the device.

12. The method of claim 6, further comprising:
sending, by the device monitoring and management platform component to a DCA connector management component running on the cloud computing network, a request to instantiate a DCA connector component container instance to realize the DCA connector component;
receiving, by the device monitoring and management platform component from the DCA connector component, a request to register the DCA connector component with the device monitoring and management platform component, upon the DCA connector component container instance being instantiated; and
registering, by the device monitoring and management platform component from the DCA connector component, the DCA connector component.

13. A system comprising:
a device interfacing platform;
a device monitoring and management platform implemented on the cloud computing network, and different than the device interfacing platform;
a device interfacing platform component that is part of the device interfacing platform and that interfaces a device located outside the cloud computing network to the cloud computing network;
a device monitoring and management platform component that is part of the device monitoring and management platform, and that is to signal to the device interfacing platform component that a work request is ready; and
a data collector agent (DCA) connector component for the device that is part of the device monitoring and management platform, and that is to poll the device interfacing platform component to determine that the work request is ready, retrieve the work request from the device monitoring and management platform component as a result of the device interfacing platform component indicating to the DCA connector component that the work request is pending in response to the DCA connector component polling the device interfacing platform component, and responsively perform the work request in conjunction with the device within a communication session established with the device via the device polling the device interfacing platform component and the device responsively initiating the communication session with the DCA connector component due to the device interface platform component indicating to the device that the work request is pending.

14. The system of claim 13, wherein the device monitoring and management platform component is further to:
receive, from a client device located outside the cloud computing network, a request to associate the device with an entity that the device monitoring and management platform services;
claim the device within the device interfacing platform; and
instruct the DCA connector component to be responsible for direct communication with the device.

15. The system of claim 13, further comprising:
a DCA connector management platform component that is part of the device monitoring and management platform, and that is to, responsive to a request from the device monitoring and management component, instantiate a DCA connector component container instance to realize the DCA connector component,
wherein the device monitoring and management platform component is to:
receive, from the DCA connector component, a request to register the DCA connector component with the device monitoring and management platform component, upon the DCA connector component container instance being instantiated;
and responsively register the DCA connector component.

* * * * *